United States Patent [19]

Shoemaker

[11] 4,000,935
[45] Jan. 4, 1977

[54] DRAWING ATTACHMENT HAVING A FOCUSING SYSTEM, POWER CHANGER SYSTEM AND A TELESCOPE FOR A MICROSCOPE

[75] Inventor: Arthur H. Shoemaker, East Aurora, N.Y.

[73] Assignee: American Optical Corporation, Southbridge, Mass.

[22] Filed: Nov. 14, 1975

[21] Appl. No.: 631,809

[52] U.S. Cl. .................................. 350/41; 350/186
[51] Int. Cl.[2] ..................... G02B 7/04; G02B 15/00
[58] Field of Search .......................... 350/41, 186

[56] References Cited
UNITED STATES PATENTS

| | | | |
|---|---|---|---|
| 3,152,214 | 10/1964 | Korones et al. | 350/41 |
| 3,649,101 | 3/1972 | Straw et al. | 350/186 |

Primary Examiner—John K. Corbin
Assistant Examiner—Jon W. Henry
Attorney, Agent, or Firm—Alan H. Spencer; William C. Nealon; H. R. Berkenstock, Jr.

[57] ABSTRACT

A drawing attachment having a focusing system, a power changer system and a telescope, when used in conjunction with an infinity-corrected microscope, permits superimposition of the object viewed through the microscope and a drawing surface for making a drawing of the object being observed. The size of the board is varied by the power changer to permit adjustment of the relative size of the object to the board. The device is designed to be used with an infinity-corrected microscope and is attached to the microscope in the parallel-light zone between the objective and the telescope lens of the microscope.

4 Claims, 1 Drawing Figure

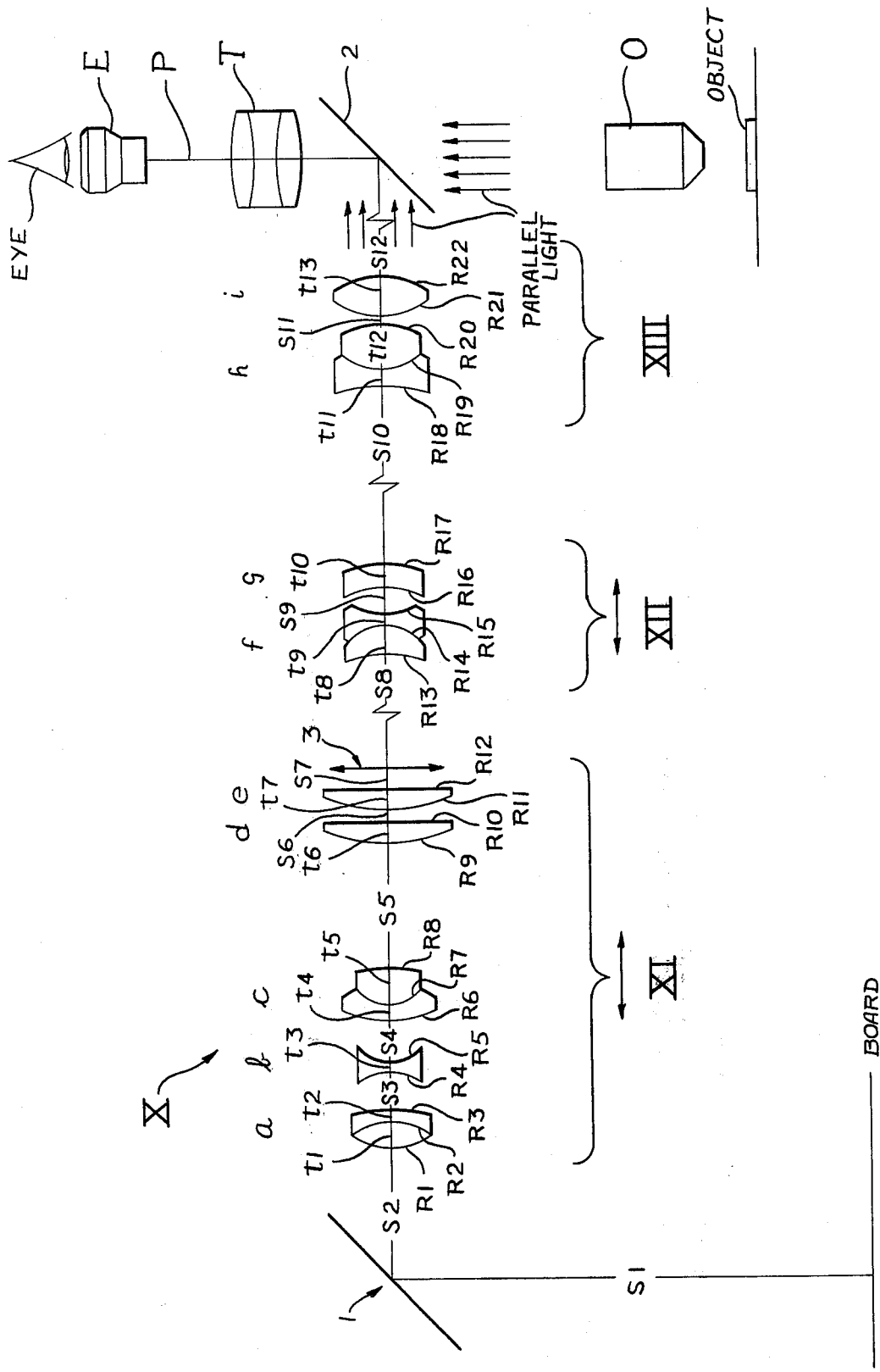

DRAWING ATTACHMENT HAVING A FOCUSING SYSTEM, POWER CHANGER SYSTEM AND A TELESCOPE FOR A MICROSCOPE

BACKGROUND OF THE INVENTION

This invention relates to drawing attachments for microscopes and more particularly, to a drawing attachment for an infinity-corrected microscope.

Drawing attachments are known to permit a microscopist to superimpose an image of an object and of a board on which an object is to be, or is being drawn. When such devices are used in microscopes which do not utilize infinity-corrected systems, positioning of the drawing attachment in the microscope system is extremely critical. The criticality is exaggeration, because it is necessary that both the object to be viewed and the board on which the drawing is made are simultaneously in focus. It is also important that optical properties of the system, such as chromatic aberration, spherical aberration, coma and astigmatism, as well as a substantially flat image field, are not adversely affected by the attachment.

An infinity-corrected microscope offers an advantage for drawing attachments, in that when positioned between an infinity-corrected objective and the telescope lens, the zone of parallel light, the optical properties of the microscope system are not adversely affected by a drawing attachment.

It is an object of this invention to provide a drawing attachment for infinity-corrected microscopes.

It is another object of the present invention to provide a drawing attachment for infinity-corrected microscopes having focusing and zoom lens systems.

It is still further an object of the present invention to provide a drawing attachment for infinity-corrected microscopes having an optical system which does not adversely affect the microscope optical system and is well corrected for the usual chromatic aberration, spherical aberration, coma and astigmatism and also has a substantially flat image field.

BRIEF DESCRIPTION OF THE PRESENT INVENTION

The present invention is directed to a drawing attachment for use in conjunction with microscopes having infinity-corrected optical systems. The drawing attachment is inserted in the zone of parallel light of the microscope optical system which is usually between the infinity-corrected objective and the telescope lens. The drawing attachment contains three groups of lenses which are a focusing system, a power changer and a telescope.

FIG. 1 is an optical diagram of a drawing attachment according to the present invention in combination with a simplified optical diagram of an infinity-corrected compound microscope.

THE PREFERRED EMBODIMENT

Referring to FIG. 1, a simplified microscope is shown having an object positioned on a stage (not shown) which is viewed through an optical system including an objective O, a telescope lens T and an eyepiece E. The optical zone between objective O and telescope lens T is a zone of parallel light.

A drawing attachment identified generally as X contains a focusing system XI, a power changer XII, and a telescope XIII horizontally arranged. Mirror 1 and beam splitter 2 conveniently deflect light from the drawing board through the drawing attachment and then along the optical path P of the microscope. Focusing system XI contains a double convex positive doublet $a$, a double concave negative singlet $b$, a double convex positive doublet $c$, a convex-plano positive singlet $d$ and a convex-plano positive singlet $e$, all aligned in sequence along an optical path. The spacings between these elements remain fixed and focusing is accomplished by movement of the entire group along the optical path to vary the total distance from the drawing board. An ariel image of the drawing is formed by focusing system XI in the vicinity of plane 3.

The power changer comprises a double convex negative doublet $f$ and a concavo-convex negative singlet $g$ sequentially aligned along the optical path. Movement of the power changer lens XII, as a unit along the optical path, varies the relative size of the board to the object being viewed through the microscope. The power changer permits the size of the board to be continuously varied through a range of 1X to 2X.

Telescope XIII comprises a concavo-convex positive double $h$ and a double convex positive singlet $i$ sequentially aligned along the optical axis and converts the light from power changer XII to parallel light. The parallel light from telescope XIII is introduced into the microscope optical system by beam splitter 2 and is reimaged by telescope lens T and eyepiece E. A suitable telescope lens system of the type described in U.S. Pat. No. 3,355,234.

Table I presents the values, as a function of $x$, of the focusing system XI, power changer XII and telescope XIII. The successive axial airspaces from the drawing board are designated S1 to S12, respectively; the successive axial lens thicknesses are designated $t1$ to $t13$, respectively and the successive lens radii are designated R1 to R22, respectively, wherein the minus sign (−) applies to surfaces whose center of curvature lies on the drawing board side of their verticies. The refractive indicies and Abbe numbers of the glasses in the successive lenses are absolute values and are designated ND1 to ND13 and $\nu1$ to $\nu13$, respectively.

TABLE I

| Lens | Radius (R) | Thickness (t) | Space (S) | Refractive Index (ND) | Abbe No. ($\nu$) |
|---|---|---|---|---|---|
| | | | S1=1.5928x | | |
| | | | S2(1X)=0.2706x | | |
| | | | (1.3X)=0.2375x | | |
| | | | (2X)=0.1150x | | |
| | R1=0.0571x | | | | |
| a | | t1=0.0230x | | ND1=1.62031 | $\nu1$=38.08 |
| | R2=−0.0575x | | | | |
| | | t2=0.0082x | | ND2=1.69669 | $\nu2$=56.14 |
| | R3=−0.3267x | | | | |
| | | | S3=0.0149x | | |
| | R4=−0.1120x | | | | |
| b | | t3=0.0082x | | ND3=1.80491 | $\nu3$=25.42 |

TABLE I-continued

| Lens | Radius (R) | Thickness (t) | Space (S) | Refractive Index (ND) | Abbe No. ($\nu$) |
|---|---|---|---|---|---|
|  | R5=0.0444x |  | S4=0.0162x |  |  |
|  | R6=0.2131x | t4=0.0082x |  | ND4=1.64752 | $\nu 4$=33.85 |
| c | R7=0.0417x | t5=0.0245x |  | ND5=1.69339 | $\nu 5$=53.34 |
|  | R8=−0.0747x |  | S5=0.1095x |  |  |
|  | R9=0.1879x | t6=0.0109x |  | ND6=1.80491 | $\nu 6$=25.42 |
| d | R10=Plano |  | S6=0.0055x |  |  |
|  | R11=0.1879x | t7=0.0109x |  | ND7=1.80491 | $\nu 7$=25.42 |
| e | R12=Plano |  | S7=0.0164x<br>S8(1X)=0.0310x<br>(1.3X)=0.0914x<br>(2X)=0.2393x |  |  |
|  | R13=−1.1118x | t8=0.0160x |  | ND8=1.80491 | $\nu 8$=25.42 |
| f | R14=−0.1025x | t9=0.0109x |  | ND9=1.49776 | $\nu 9$=66.90 |
|  | R15=0.1275x |  | S9=0.0055x |  |  |
|  | R16=−0.0681x | t10=0.0109x |  | ND10=1.51105 | $\nu 10$=60.41 |
| g | R17=−0.5063x |  | S10(1X)=0.1923x<br>(1.3X)=0.1699x<br>(2X)=0.1447x |  |  |
|  | R18=−1.4615x | t11=0.0160x |  | ND11=1.80491 | $\nu 11$=25.42 |
| h | R19=0.2168x | t12=0.0219x |  | ND12=1.62032 | $\nu 12$=60.28 |
|  | R20=−0.3195x |  | S11=0.0015x |  |  |
| i | R21=0.5327x | t13=0.0219x |  | ND13=1.62032 | $\nu 13$=60.28 |
|  | R22=−0.3296x |  | S12=0.2080x |  |  |

$x$ is a variable, preferably, within the range of 150mm to 200 mm. The best results are usually obtained in the range of 175mm to 185mm.

The values of a specific embodiment, wherein $x$ is 182.70 are shown in Table II.

TABLE II

| Lens | Radius (R) | Thickness (t) | Space (S) |
|---|---|---|---|
|  |  |  | S1=291.000<br>S2(1X)=49.440<br>(1.3X)=43.400<br>(2X)=21.010 |
| a | R1=10.433 | t1=4.198 |  |
|  | R2=−10.512 | t2=1.500 |  |
|  | R3=−59.686 |  | S3=2.715 |
| b | R4=−20.470 | t3=1.500 |  |
|  | R5=8.118 |  | S4=2.958 |
|  | R6=38.937 | t4=1.500 |  |
| c | R7=7.623 | t5=4.477 |  |
|  | R8=−13.646 |  | S5=20.000 |
| d | R9=34.337 | t6=2.000 |  |
|  | R10=Plano |  | S6=1.000 |
| e | R11=34.337 | t7=2.000 |  |
|  | R12=Plano |  | S7=3.000<br>S8(1X)=5.666<br>(1.3X)=16.705<br>(2X)=43.712 |
| f | R13=−203.119 | t8=2.925 |  |
|  | R14=−18.726 | t9=2.000 |  |
|  | R15=23.298 |  | S9=1.000 |
| g | R16=−12.450 | t10=2.000 |  |
|  | R17=−92.496 |  | S10(1X)=35.141<br>(1.3X)=31.043<br>(2X)=26.429 |
|  | R18=−267.019 | t11=3.000 |  |
| h | R19=39.612 | t12=4.000 |  |
|  | R20=−58.372 |  | S11=0.270 |
| i | R21=97.320 | t13=4.000 |  |
|  | R22=−60.216 |  | S12=19.000 |

The foregoing embodiments are representative of the best mode of the present invention. However, it is apparent that other embodiments are possible and changes made within the skill of the art without departing from the spirit of this invention.

What is claimed is:

1. A drawing attachment comprising, all sequentially aligned along an optical path, a focusing system XI including (a) a double convex positive doublet, (b) a double concavo negative singlet, (c) a double convex positive doublet (d) a convex-plano positive singlet and (e) a convex-plano positive singlet, a power changer XII including (f) a double convex negative doublet and (g) a concavo-convex negative singlet, said power changer being axially slideable along said optical path, and a telescope XIII including (h) a concavo-convex positive doublet and (i) a double convex positive singlet.

2. The drawing attachment, according to claim 1, wherein lenses *a-i* have values as set forth in the following table, the successive axial airspaces along said optical path being designated S1 to S12, the successive axial lens thicknesses being designated $t1$ to $t13$, respectively, the successive lens radii being designated R1 to R22 with a minus sign (−) identifying surfaces whose center of curvature lies on the drawing side of their verticies, refractive indices and Abbe numbers are absolute values of the respective glasses and being designated ND1 to ND13 and $\nu1$ to $\nu13$:

| Lens | Radius (R) | Thickness (t) | Space (S) | Refractive Index (ND) | Abbe No. ($\nu$) |
|---|---|---|---|---|---|
|   |   |   | S1=1.5928x<br>S2(1X)=0.2706x<br>(1.3X)=0.2375x<br>(2X)=0.1150x |   |   |
|   | R1=0.0571x |   |   |   |   |
|   |   | t1=0.0230x |   | ND1=1.62031 | $\nu1$=38.08 |
| a | R2=−0.0575x |   |   |   |   |
|   |   | t2=0.0082x |   | ND2=1.69669 | $\nu2$=56.14 |
|   | R3=−0.3267x |   |   |   |   |
|   |   |   | S3=0.0149x |   |   |
|   | R4=−0.1120x |   |   |   |   |
| b |   | t3=0.0082x |   | ND3=1.80491 | $\nu3$=25.42 |
|   | R5=0.0444x |   |   |   |   |
|   |   |   | S4=0.0162x |   |   |
|   | R6=0.2131x |   |   |   |   |
|   |   | t4=0.0082x |   | ND4=1.64752 | $\nu4$=33.85 |
| c | R7=0.0417x |   |   |   |   |
|   |   | t5=0.0245x |   | ND5=1.69339 | $\nu5$=53.34 |
|   | R8=−0.0747x |   |   |   |   |
|   |   |   | S5=0.1095x |   |   |
|   | R9=0.1879x |   |   |   |   |
| d |   | t6=0.0109x |   | ND6=1.80491 | $\nu6$=25.42 |
|   | R10=Plano |   |   |   |   |
|   |   |   | S6=0.0055x |   |   |
|   | R11=0.1879x |   |   |   |   |
| e |   | t7=0.0109x |   | ND7=1.80491 | $\nu7$=25.42 |
|   | R12=Plano |   |   |   |   |
|   |   |   | S7=0.0164x<br>S8(1X)=0.0310x<br>(1.3X)=0.0914x<br>(2X)=0.2393x |   |   |
|   | R13=−1.1118x |   |   |   |   |
|   |   | t8=0.0160x |   | ND8=1.80491 | $\nu8$=25.42 |
| f | R14=−0.1025x |   |   |   |   |
|   |   | t9=0.0109x |   | ND9=1.49776 | $\nu9$=66.90 |
|   | R15=0.1275x |   |   |   |   |
|   |   |   | S9=0.0055x |   |   |
|   | R16=−0.0681x |   |   |   |   |
| g |   | t10=0.0109x |   | ND10=1.51105 | $\nu10$=60.41 |
|   | R17=−0.5063x |   |   |   |   |
|   |   |   | S10(1X)=0.1923x<br>(1.3X)=0.1699x<br>(2X)=0.1447x |   |   |
|   | R18=−1.4615x |   |   |   |   |
|   |   | t11=0.0160x |   | ND11=1.80491 | $\nu11$=25.42 |
| h | R19=0.2168x |   |   |   |   |
|   |   | t12=0.0219x |   | ND12=1.62032 | $\nu12$=60.28 |
|   | R20=−0.3195x |   |   |   |   |
|   |   |   | S11=0.0015x |   |   |
|   | R21=0.5327x |   |   |   |   |
| i |   | t13=0.0219x |   | ND13=1.62032 | $\nu13$=60.28 |
|   | R22=−0.3296x |   |   |   |   |
|   |   |   | S12=0.2080x |   |   | and x is between 150mm and 200mm.

3. The drawing attachment according to claim 2 wherein x is from 175mm to 185mm.

4. The drawing attachment according to claim 2 wherein x is 182.7mm.

* * * * *